United States Patent [19]

Hagenbuch

[11] Patent Number: 4,474,404

[45] Date of Patent: Oct. 2, 1984

[54] VEHICULAR BODY FOR HAULING HOT SLAG AND OTHER MATERIALS

[76] Inventor: Leroy G. Hagenbuch, 4602 N. Rosemead, Peoria, Ill. 61614

[21] Appl. No.: 392,523

[22] Filed: Jun. 28, 1982

[51] Int. Cl.$^3$ .............................................. B60J 1/00
[52] U.S. Cl. ................................ 296/184; 296/39 A; 296/203; 298/1 H; 266/165
[58] Field of Search ................... 296/183, 184, 39 R, 296/39 A, 187, 203; 298/1 H; 165/41, 54, 56, 169; 220/435, 437, 439, 901; 266/143, 165; 105/238 R, 404, 409, 355; 403/208, 235–236, 28, 392, 5, 6, 8; 52/483, 573

[56] References Cited

U.S. PATENT DOCUMENTS

| | | | |
|---|---|---|---|
| 1,948,477 | 2/1934 | Zenner | 220/901 |
| 2,756,095 | 7/1956 | Schnell | 296/183 |
| 2,910,322 | 10/1959 | Magor | 296/184 |
| 3,159,420 | 12/1964 | McCrossen | 296/39 R X |
| 3,288,530 | 11/1966 | McGlade | 296/183 X |
| 3,325,045 | 6/1967 | Habozit et al. | 52/573 X |
| 3,472,548 | 10/1969 | Comisac | 298/1 H X |
| 3,550,335 | 12/1970 | Huffman | 52/573 X |
| 3,897,972 | 8/1975 | Logue | 296/184 |

Primary Examiner—David A. Scherbel
Assistant Examiner—Russell D. Stormer
Attorney, Agent, or Firm—Leydig, Voit, Osann, Mayer & Holt, Ltd.

[57] ABSTRACT

A vehicular body for hauling materials, comprising an external skeletal frame of metal members forming the primary load-bearing structure of the body; a metal lining supported by the skeletal frame and forming the interior surfaces of the body for containing loads of material, the exterior surface of the lining being exposed to the ambient atmosphere through the openings in the skeletal frame; and coupling devices securing the lining to the skeletal frame while permitting relative movement between the lining and the frame so that the lining and the frame can expand and contract differentially without stressing each other. The lining of the vehicular body is preferably detachably coupled to the skeletal frame to facilitate removal of the lining for maintenance or replacement purposes.

17 Claims, 19 Drawing Figures

U.S. Patent   Oct. 2, 1984   Sheet 1 of 4   4,474,404
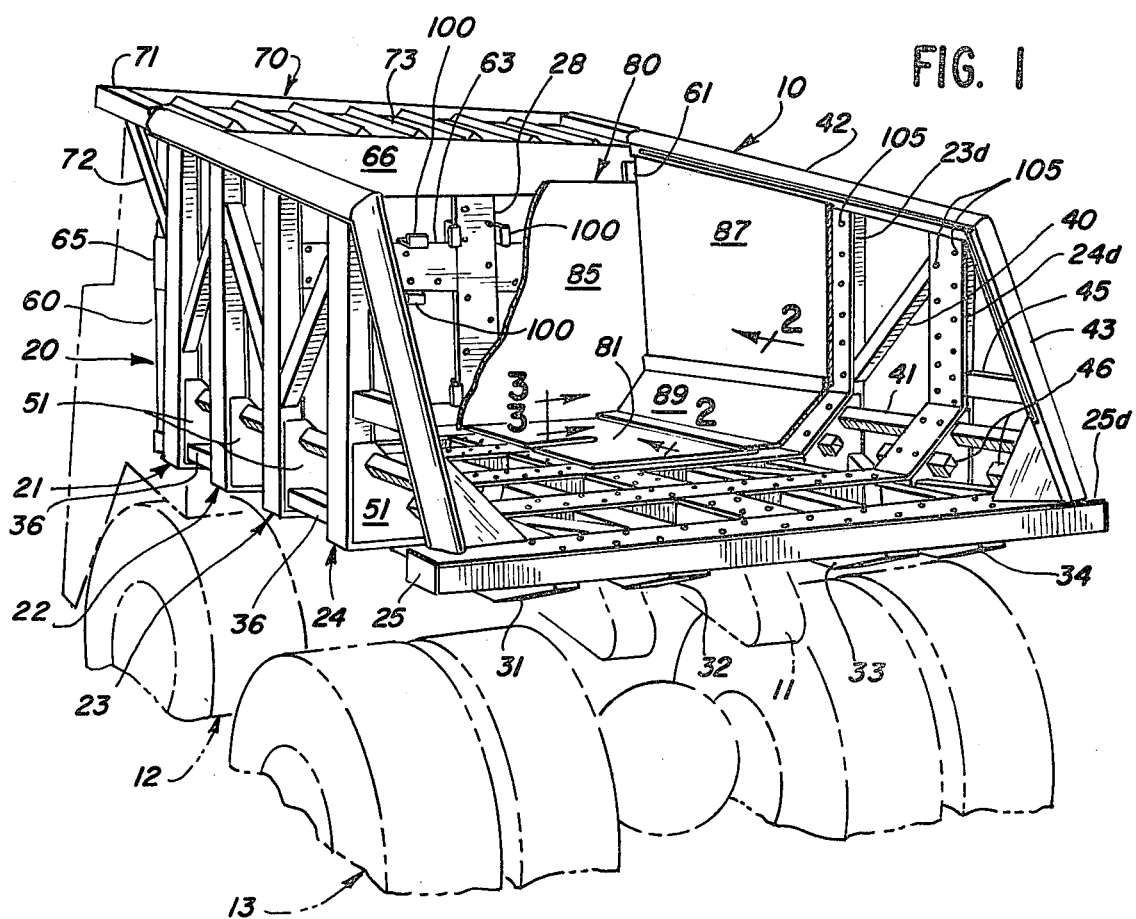
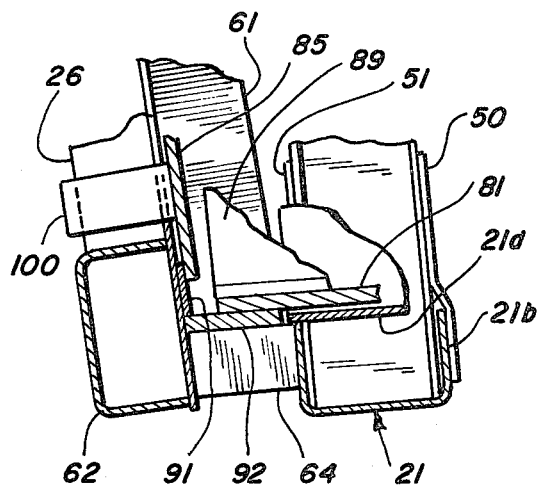
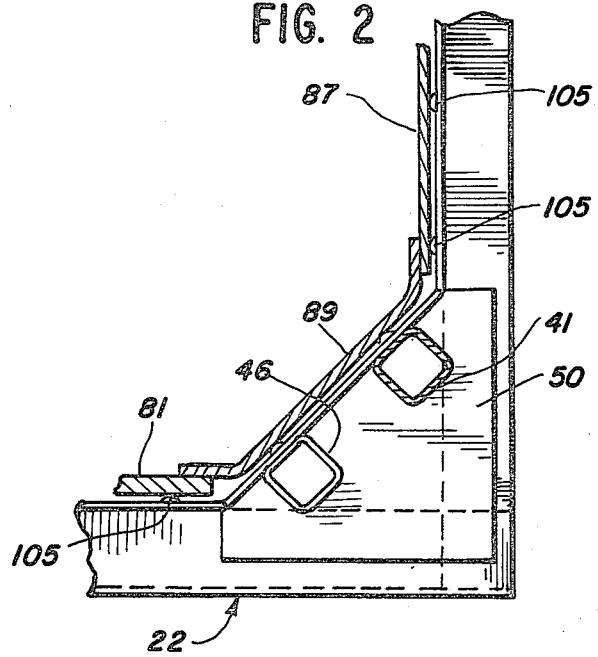

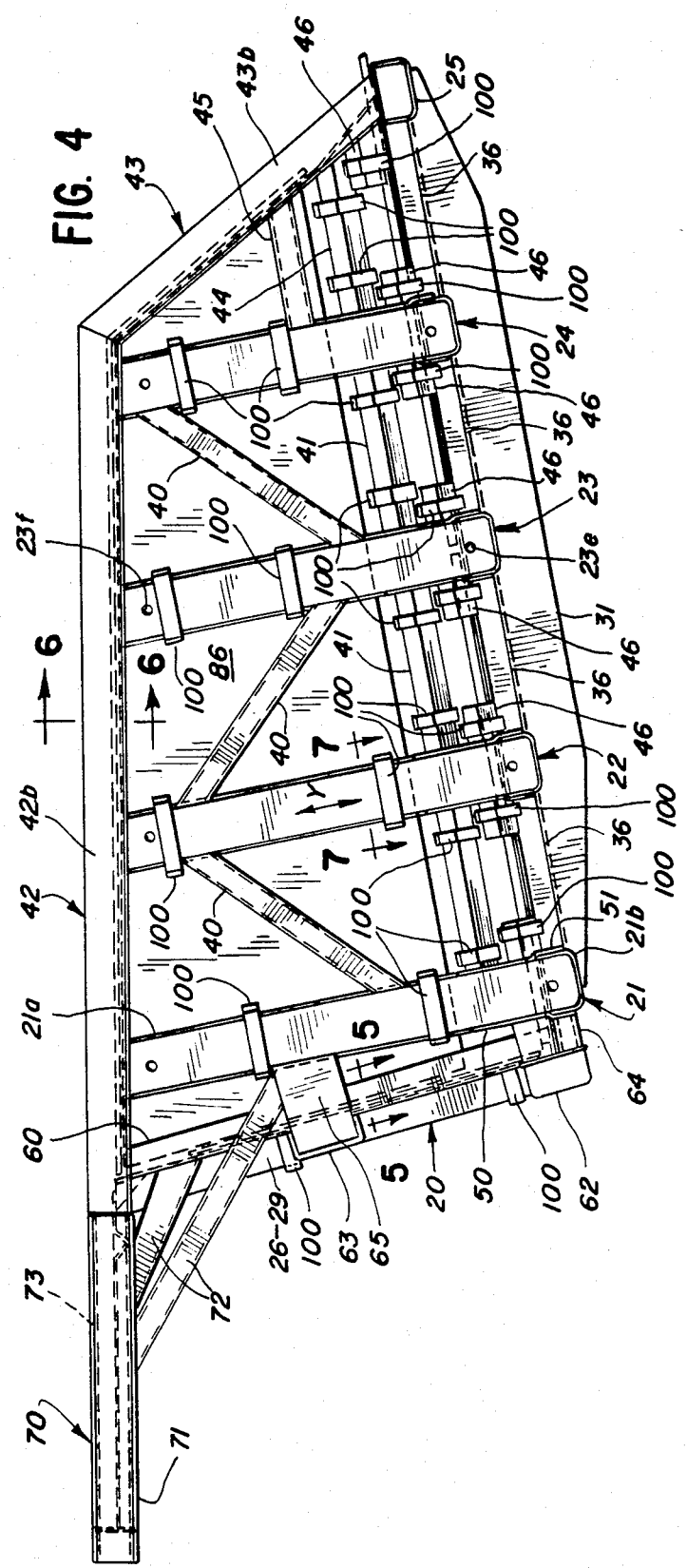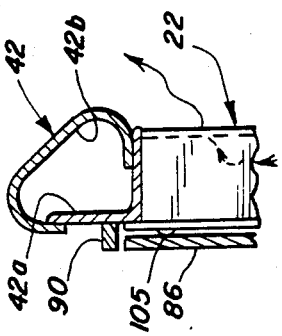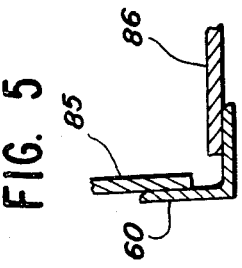

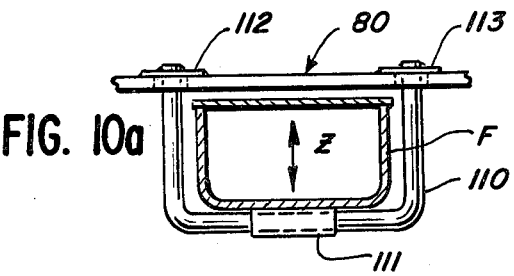 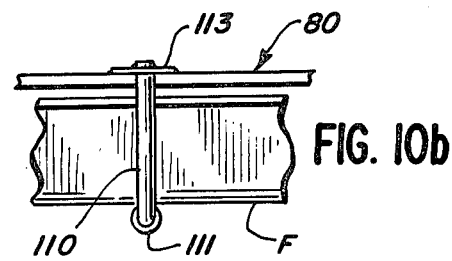
FIG. 10a   FIG. 10b
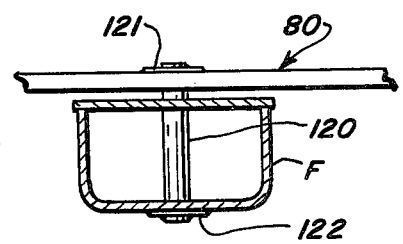 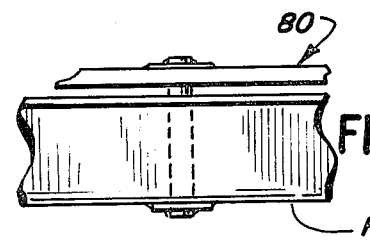
FIG. 11a   FIG. 11b
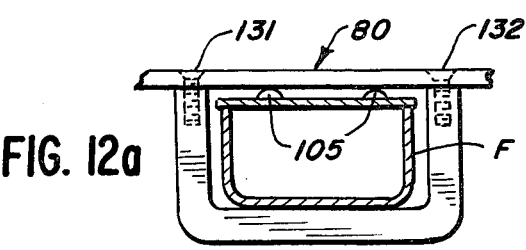 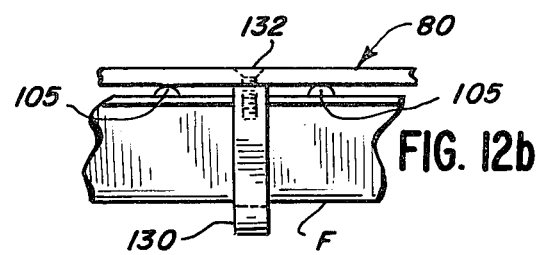
FIG. 12a   FIG. 12b
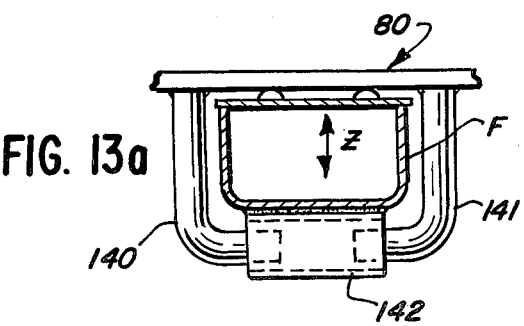 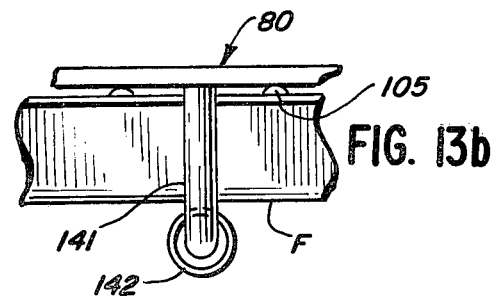
FIG. 13a   FIG. 13b
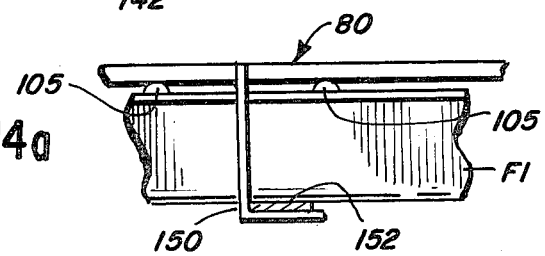
FIG. 14a
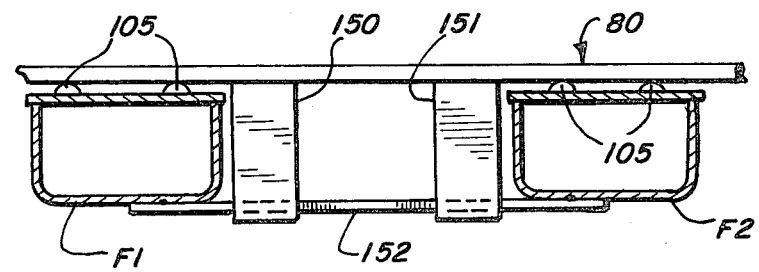
FIG. 14b

VEHICULAR BODY FOR HAULING HOT SLAG AND OTHER MATERIALS

DESCRIPTION OF THE INVENTION

The present invention relates to vehicular bodies, such as truck or trailer bodies. This invention particularly relates to vehicular bodies having removable liners and/or to vehicular bodies which can be used to haul hot materials such as hot slag from blast furnaces in steel mills; such slags are hauled at temperatures as high as 1500° to 2000° F. and up. The vehicles normally used to haul such slags are off-highway trucks having capacities of 25-30 tons and up, and the load-hauling bodies of these trucks are subjected to wide temperature swings and attendant stresses due to the high temperatures and thermal expansion and contraction, in addition to the usual physical stresses due to the weight of the load and the impacts produced by the loading and unloading of the heavy slag.

It is a primary object of the present invention to provide an improved vehicular body which is capable of hauling hot materials such as blast furnace slag and yet minimizes thermal and physical stresses on the structure of the body. In this connection, a related object of the invention is to provide such an improved vehicular body which has a long operating life with little or no maintenance.

It is another important object of this invention to provide such an improved vehicular body which efficiently dissipates heat from the hot slag or other hot material being hauled without subjecting the load-bearing structure to excessive temperature fluctuations. A related object is to provide such an improved vehicular body which minimizes the temperature ranges through which the load-bearing structure of the body is cycled while hauling successive loads of hot slag.

A further object of this invention is to provide such an improved vehicular body which minimizes the stresses imposed on the body by thermal expansion and contraction, including the stresses due to differential rates of thermal expansion and contraction between different parts of the body.

Still another object of the present invention is to provide an improved vehicular body of the foregoing type which also minimizes the weight of the body, with corresponding reductions in manufacturing and operating costs, relative to existing hot material-hauling bodies.

A still further object of this invention is to provide an improved vehicular body of the type described above which can be efficiently and economically manufactured.

Another principal object of the present invention is to provide an improved vehicular body which permits the interior surfaces of the body, which are the surfaces that wear most rapidly, to be easily removed and replaced, thereby reducing maintenance costs.

Other objects and advantages of the invention will be apparent from the following detailed description and the accompanying drawings.

In accordance with the present invention, there is provided a vehicular body for hauling materials, comprising an external skeletal frame of metal members forming the primary load-bearing structure of the body; a metal lining supported by the skeletal frame and forming the interior surfaces of the body for containing loads of material, the exterior surface of the lining being exposed to the ambient atmosphere through the openings in the skeletal frame; and coupling means securing the lining to the skeletal frame while permitting relative movement between the lining and the frame so that the lining and the frame can expand and contract differentially without stressing each other. The lining of the vehicular body is preferably detachably coupled to the skeletal frame to facilitate removal of the lining for maintenance or replacement purposes.

In the drawings:

FIG. 1 is a perspective view of a truck body constructed in accordance with a preferred embodiment of the invention;

FIG. 2 is an enlarged section taken generally along line 2—2 in FIG. 1;

FIG. 3 is an enlarged section taken generally along line 3—3 in FIG. 1;

FIG. 4 is an enlarged side elevation of the truck body of FIG. 1;

FIG. 5 is an enlarged section taken generally along line 5—5 in FIG. 4;

FIG. 6 is an enlarged section taken generally along line 6—6 in FIG. 4;

FIG. 7 is an enlarged section taken generally along line 7—7 in FIG. 4;

FIGS. 10a and 10b are side and end elevations of a modified coupling arrangement, suitable for use in place of the arrangement shown in FIGS. 1-9, for coupling the lining of the truck body to the frame;

FIGS. 11a and 11b are side and end elevations of another modified coupling arrangement;

FIGS. 12a and 12b are side and end elevations of a further modified coupling arrangement;

FIGS. 13a and 13b are side and end elevations of yet another modified coupling arrangement; and FIGS. 14a and 14b are end and side elevations of a still further modified coupling arrangement.

Figure 8:
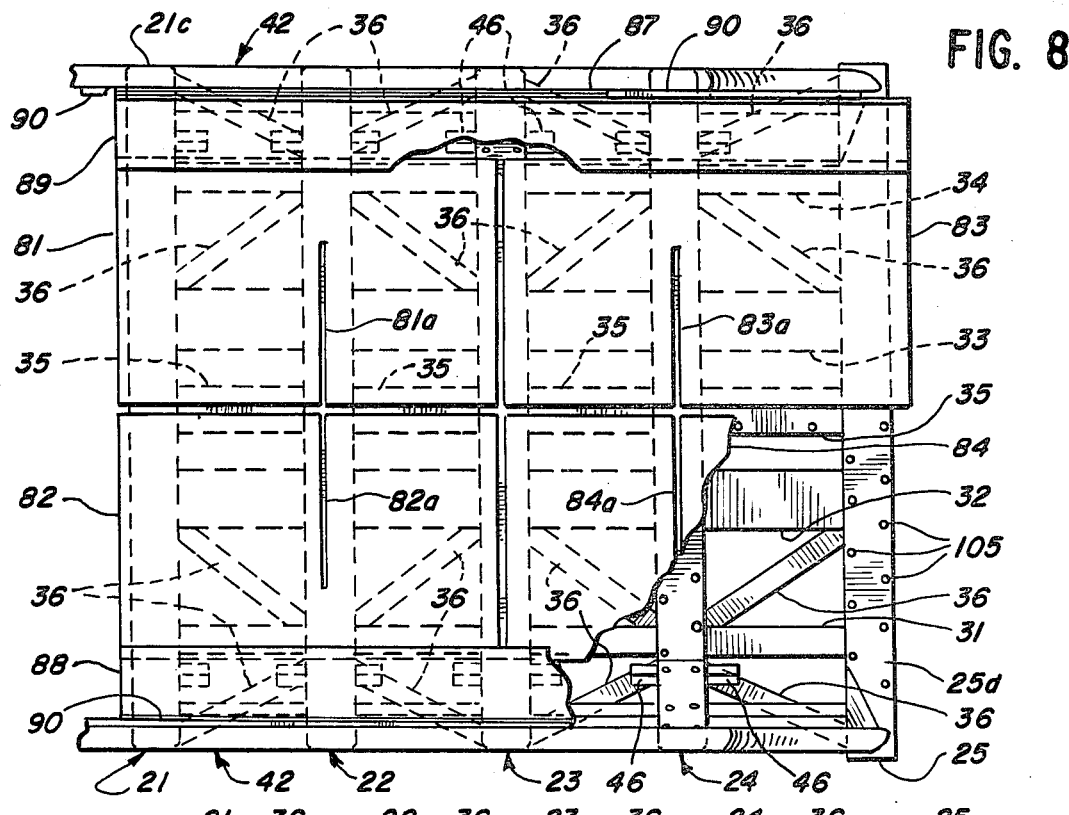
FIG. 8 is an enlarged top plan view of a portion of the truck body of FIG. 1, with portions broken away to reveal the underlying structure.

While the invention has been shown and will be described in some detail with reference to specific exemplary embodiments, there is no intention to limit the invention to such detail. To the contrary, it is intended to cover all modifications, alternatives and equivalent arrangements which fall within the spirit and scope of the invention as defined in the appended claims.

Turning now to the drawings and referring first to FIG. 1, there is shown an off-highway truck or trailer body 10 which is suitable, inter alia, for transporting hot blast furnace slag. The body 10 is pivotally mounted on a chassis 11 so that a suitable hydraulic actuator (not shown) can raise and lower the body 10 to dump a load contained therein. In the particular example illustrated, the truck is equipped with multiple pairs or sets of wheels 12 and 13, but the invention is equally applicable to trucks equipped with endless traction belts or treads.

In keeping with the invention, the principal load-bearing structure of the truck body 10 is formed by an external, exposed skeletal frame 20. The skeletal frame 20 generally comprises multiple bolsters which function as the primary load-bearing members, and multiple struts or braces which interconnect the bolsters and function as secondary load-bearing members. More particularly, the sides and bottom of the illustrative frame 20 include four parallel and spaced apart U-shaped bolsters 21, 22, 23 and 24. Each of these bolsters 21-24 is formed by three steel channel sections, such as sections 21a, 21b and 21c in the case of the front bolster 21, welded together to form the desired U-shaped configuration, with an elongated steel plate welded to the open sides of the channel sections to form a hollow tubular bolster structure. In the case of the front bolster 21, the open sides of the three channel sections 21a-c, which are on the inside of the bolster, are closed along the major portions of the channel sections by a steel plate 21d welded to the longitudinal edges of the channel sections. The other three bolsters 22, 23 and 24 include similar plates 22d, 23d and 24d, respectively. The open sides of the channel sections are not closed by the plates 21d-24d in the regions of the lower inside corners of the U-shaped bolsters, because the plates are bent to bridge diagonally across the corners formed by the welded channel sections, as can be seen in FIGS. 1 and 2, rather than following the sharp corners formed by the channel sections.

To assist in dissipating heat from the U-shaped bolsters, the vertical legs thereof are provided with holes near the top and bottom of the exterior walls, such as the holes 23e and 23f shown in FIG. 4. These holes produce a "chimney" effect, with air being drawn in through the bottom holes, passing upwardly through the channels, and exhausted through the top holes. The cooling effect of the air flow helps to minimize the temperature range through which the skeletal frame is cycled.

In addition to the four U-shaped bolsters 21-24, the skeletal frame 20 includes a single transverse bolster 25 at the lower rear edge of the body 10, four upright bolsters 26, 27, 28 and 29 in the front wall of the body, and four longitudinal rails 31, 32, 33 and 34 in the bottom wall. The bolsters are all tubular members formed by welding a flat steel plate to the open side of a channel section, in the same manner described above in connection with the bolsters 21-24. The four bottom rails 31-34, on the other hand, are formed by welding together four flat steel plates because these rails are shaped to mesh with the transverse portions of the U-shaped bolsters 21-24 and the rear bolster 25.

Figure 9:
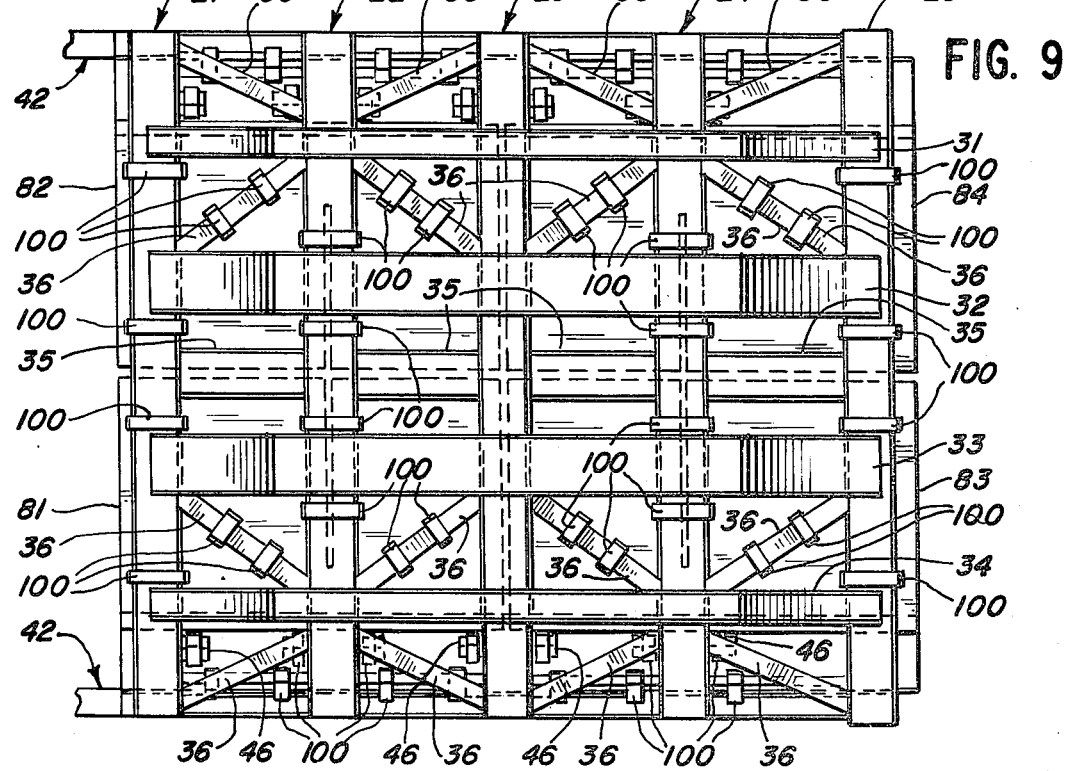
FIG. 9 is an enlarged bottom plan view of a portion of the truck body of FIG. 1.

The construction of the bottom of the skeletal frame 20 can be seen most clearly in FIGS. 8 and 9. The two inboard longitudinal rails 32 and 33 are wider than the two outboard rails 31 and 34 in order to provide stronger reinforcement of the transverse sections of the bolsters 21-25 in the central portions thereof. The top portions of all four of the longitudinal rails 31-34 are notched, as can be seen in FIG. 4, so that these four rails fit over portions of the five transverse bolsters 21-25. That is, the four rails 31-34 and the five bolsters 21-25 form a grid, as can be clearly seen in FIG. 9, with the rails and bolsters being welded to each other at each intersection of the grid.

To further strengthen the grid of intersecting rails and bolsters which form the bottom of the body 10, each "window" of the grid includes a reinforcing strut or brace. More specifically, each of the windows located between the two large longitudinal rails 32 and 33, contains a brace 35 which extends parallel to the rails 32 and 33, interconnecting successive pairs of the bolsters 21-25. The ends of these braces 35 are welded to the bolsters which they interconnect. As in the case of the bolsters, the braces 35 are formed of channel sections having flat steel plates welded to the open sides thereof, flush with the plates 21d-25d which form the inside surfaces of the bolsters 21-25. As can be seen in FIG. 1, this forms a uniformly flat bottom surface on the inside of the skeletal frame 20.

The other four rows of windows formed by the grid of rails and bolsters illustrated in FIG. 9 receive diagonal struts 36 made of hollow square steel tubing. Here again, one strut 36 is positioned within each window, extending between and interconnecting an adjacent pair of the five transverse bolsters 21-25. The two inboard rows of struts 36 also engage and interconnect adjacent pairs of the longitudinal rails 31-34. As in the case of the braces 35, the ends of the struts 36 are welded to the particular bolsters and rails interconnected thereby.

As will be appreciated from the foregoing description, and from an examination of FIG. 9, the grid of intermeshing transverse bolsters and longitudinal rails in the bottom wall of the skeletal frame 20 forms an array of twenty windows, which in turn are divided by the various braces 35 and struts 36 to form an array of forty smaller windows. These multiple windows permit heat to be radiated directly from the lining of the body to the ambient atmosphere, without passing through any of the structural members forming the skeletal frame.

Turning next to a more detailed examination of the side walls of the skeletal frame, and referring particularly to FIG. 4, it can be seen that each side wall is formed by the vertical legs of the U-shaped bolsters 21-24 in combination with various struts 40 and braces 41; a top rail 42 which is welded to the tops of the U-shaped struts 21-24 and defines the top edge of the body 10; and a rear rail 43 extending downwardly from the top rail 42 to the rearmost transverse bolster 25. As can be seen most clearly in FIG. 6, each of the rails 42 and 43 is formed from an angle 42a or 43a welded to a generally C-shaped channel 42b or 43b. The angle 42a is welded to the tops of the U-shaped bolsters 21-24 and the angle 43a is welded to the end of the angle 42a and to the top of the transverse bolster 25.

To provide the requisite reinforcement of the side walls of the body 10, the upright portions of the U-shaped bolsters 21-24 are interconnected by the diagonal struts 40; and a series of straight longitudinal braces 41 interconnect adjacent pairs of the bolsters 21-24 between the diagonal struts 40 and the bottom struts 36. In addition, at the rear end of the side wall, a pair of braces 44 and 45 connect the bolster 24 to the rear rail 43. The ends of these struts 40 and braces 41-45 are welded to the bolsters or rails which they interconnect. In order to enclose the open sides of the channel sections at the inside corners of the four U-shaped bolsters 21-24, where the steel plates 21d-24d are angled across the corners (see FIG. 2), a pair of generally triangular plates 50 and 51 are welded to opposite sides of the bottom corners formed by each of the bolsters 21-24. These plates 50 and 51 overlap substantial portions of the side walls of the respective bolsters 21-24 and extend inwardly therefrom to the diagonal, corner-bridging portions of the steel plates 21d-24d. The triangular plates 50 and 51 are welded to the side walls of the respective channel sections as well as the corner-bridging portions of the respective steel plates 21d-24d.

As in the case of the bottom wall of the skeletal frame 20, it can be seen that the matrix of bolsters, rails, struts and braces in the side walls of the frame form an array of windows through which heat can be radiated from the interior lining of the body 10 directly to the ambient atmosphere, without passing through any of the structural frame members.

The front wall of the skeletal frame 20, which is shown most clearly in FIGS. 1, 3 and 4, comprises the four upright bolsters 26–29 plus a pair of vertical angles 60 and 61 which form the corners of the front and side walls. In addition, two transverse bolsters 62 and 63 are welded to the two angles 60, 61 and the four bolsters 26–29. These transverse bolsters 62 and 63 are also joined to the adjacent U-shaped bolster 21 by a plurality of struts 64 and 65, respectively. The upper ends of the angles 60, 61 and the bolsters 26–29 are interconnected by a transverse plate 66 which forms the top edge of the front wall of the body 10. The angles 60, 61 and the plate 66 are also welded to forward extensions of the top rails 42.

To cover the cab of the illustrative truck, a canopy 70 projects forwardly from the top of the front wall of the body 10. This canopy 70 is formed by a frame 71 supported by a plurality of diagonal struts 72 welded to the front wall of the skeletal frame 20. The interior of the frame 71 is closed by a ribbed steel sheet 73 which is supported by several braces (not shown) extending across the lower portion of the frame 71.

As will be appreciated from the foregoing description, the skeletal frame 20 has a large number of open areas or "windows" through which heat can be dissipated directly from the interior lining of the body to the ambient atmosphere without passing through the load-bearing members forming the frame 20. Consequently, a high percentage of the heat from a load of hot slag can be conducted or radiated to the ambient atmosphere without heating the primary load-bearing members.

When a welded structure such as the skeletal frame 20 is subjected to temperature cycling over wide temperature ranges, particularly temperatures that range as high as those of blast furnace slags (1500° to 2000° F.), the repeated thermal expansion and contraction and the accompanying stresses ultimately fracture the framework at the weld joints. Particularly destructive are the differential rates of thermal expansion and contraction between different parts of the body due to temperature gradients between the interior and exterior of the body. As will be appreciated from the ensuing description, the present invention minimizes temperature cycling of the load-bearing frame, and also minimizes stressing of different parts of the body due to differential rates of thermal expansion and contraction, thereby extending the operating life of the body and minimizing maintenance problems.

In accordance with one particular aspect of the present invention, the interior surfaces of the body 10 are formed by a metal lining 80 comprising a plurality of steel plates, each of which is supported by the skeletal frame 20 and yet is free to expand and contract relative to the frame, as well as adjacent plates. It is this lining 80 that contains the load of hot slag or other material by bridging across the many openings or windows formed by the skeletal frame, and the contour of the lining 80 follows that of the inside surface of the skeletal frame 20. In the particular embodiment illustrated in FIGS. 1–9, the interior lining 80 is formed by four floor plates 81, 82, 83 and 84 (FIG. 8), a front plate 85 (FIG. 1), a pair of side plates 86 and 87 (FIGS. 1 and 4), and a pair of corner plates 88 and 89 (FIGS. 1 and 8) extending along the corners formed by the side walls and the bottom wall. As can be seen in FIG. 8, the four floor plates 81–84 are positioned symmetrically on the inside of the bottom of the skeletal frame 20, with adjacent plates slightly spaced from each other to allow for expansion when the temperature of the plates is increased by a hot load. The gaps between the four plates are positioned over the transverse portion of the bolster 23 and the longitudinal braces 35. The four floor plates 81–84 also have transverse slots 81a, 82a, 83a and 84a formed therein to permit the plates to expand and contract without buckling.

The two side plates 86 and 87 extend upwardly to the tops of the bolsters 21–24 where short deflecting flanges 90 (FIG. 6) extend inwardly from the rails 42 and 43 to prevent slag, or any other material being hauled, from falling down along the outside surfaces of the side lining plates 86 and 87. The deflecting flanges 90 are spaced slightly above the top edges of the side plates 86 and 87 to permit the plates to expand in the vertical direction without interfering with the flanges 90.

The bottom edges of the side plates 86 and 87 terminate slightly above the beveled corners formed by the 45° portions of the steel plates 21d–24d which form part of the bolsters 21–24. The bottom edge portions of the side plates 86 and 87 overlap upper edge portions of the respective corner plates 88 and 89, which are bent upwardly to be parallel with the side plates. The overlapping portions of these two pairs of plates 86, 88 and 87, 89 are in sliding contact with each other so that all the plates are free to expand and contract relative to each other. Similarly, the bottom edge portions of the corner plates 88 and 89 are bent upwardly and overlap the adjacent edge portions of the bottom plates 81–84 so that these plates can also slide over each other as they expand and contract with temperature changes.

The front wall plate 85 and the front floor plates 81 and 82 are also spaced away from each other at the lower front corner of the body, as can be seen in FIG. 3. The bottom edge portion of the front plate slides on a transverse spacer strip 91 welded to the bolster 62, and the front edge portions of the floor plates 81 and 82 slide on a transverse spacer plate 92 welded to the tops of the struts 64.

To permit the lining 80 to expand and contract with a minimum of stress on both the lining and the supporting skeletal frame 20, the lining 80 is coupled to the frame 20 by retaining means which permit relative movement between the lining and the frame. Thus, the lining 80 is free to expand along the inside surface of the skeletal frame 20 when the temperature of the lining is raised by a load of hot slag placed in the truck body, without stressing either the lining or the frame. Similarly, when the hot slag is removed and the lining 80 cools down, the lining is free to contract along the inside surface of the skeletal frame 20 without exerting stresses on the lining or the frame. The lining is not constrained by any rigid or fixed points of attachment to the primary load-bearing frame.

Thus the outer skeletal frame 20 and the inner lining 80—which are cycled through different temperature ranges both because of their different relationships to the hot load material and because of the manner in which they are coupled to each other, and which can also have different coefficients of thermal expansion—are free to expand and contract to different extents and at different rates relative to each other. This in turn minimizes the stresses that would otherwise be exerted on both the frame 20 and the lining 80 due to differential thermal expansion and contraction between these two different parts of the body 10.

In the illustrative embodiment, the coupling means comprise multiple U-shaped straps 100 which extend around various elements of the skeletal frame 20 and are welded to the exterior surface of the lining 80. More specifically, and as shown most clearly in FIG. 7, the two free ends of the U-shaped straps 100 may be bent outwardly to form a pair of flanges 101, 102 which are welded to the exterior surface of the lining 80. The interior cross-sectional dimension of each U-shaped strap 100 is greater than the exterior cross-sectional dimension of the frame member encompassed by the strap, to allow for differential expansion and contraction of the lining and the frame relative to each other. Thus the parallel legs 103, 104 of each strap 100 are spaced away from the adjacent surfaces of the encompassed frame member to permit the lining 80 to move freely back and forth along the axis indicated by the arrow X in FIG. 7 without being restrained by the frame member 22, and without exerting any stress on either the lining 80 or the frame 20 due to differential rates of expansion and contraction. In addition, the lining 80 can move back and forth along the frame member in the longitudinal direction, i.e., along the axis indicated by the arrow Y in FIG. 4. Viewed in its entirety, the lining 80 as a whole is free to expand and contract in all directions relative to the skeletal frame 20 while being held captive on the frame by the retaining straps 100.

As can be seen from the various views of the exemplary body in FIGS. 1–9, multiple retaining straps 100 are welded to each of the lining plates 81–89. For example, referring to FIG. 4, it can be seen that each side plate 86 and 87 is coupled to the four bolsters 21–24 by eight retaining straps 100, i.e., two retraining straps 100 couple each side plate to each bolster. The coupling arrangement for the four floor plates 81–84 can be seen most clearly in FIG. 9, which shows that each of the four floor plates 81–84 is coupled to the transverse sections of two of the bolsters 21–25, and to two of the diagonal struts 36; here again, two of the straps 100 are used to couple each floor plate to each of the four structural members used to hold that particular plate. In the case of the corner plates 88 and 89, the retaining straps 100 couple the plates to the side-wall braces 41 and to a pair of mounting stubs 46 located between each adjacent pair of the five bolsters 21–25. These stubs 46 are formed of hollow square steel tubing welded into the respective bolsters (see FIG. 2). It will be appreciated that the retaining straps 100 are strategically located not only to provide adequate coupling of each liner plate to the skeletal frame, but also to permit each liner plate to expand in any direction within its own plane.

In order to minimize the temperature cycling of the skeleton frame, means are preferably provided for limiting thermal conduction between the skeletal frame 20 and the lining 80. In the illustrated embodiment, such thermal conduction is limited by a multiplicity of beads 105 formed on the interior surface of the skeletal frame 20. These beads 105 are welded to the flat plates which form the inside surfaces of the various bolsters that function as the primary load-bearing members of the skeletal frame 20. The beads 105 are located at approximately equally spaced intervals over the entire interior surface of the frame 20, and each bead is rounded (see FIG. 7) so that the actual area of engagement between the bead and the frame approaches a point contact. Consequently, the path for thermal conduction between the lining 80 and the frame 20 is extremely limited.

It will be recognized that the retaining straps 100 themselves also provide a path for thermal conduction from the lining 80, but again this path is quite limited. Furthermore, most of the heat that enters the straps 100 from the lining 80 is dissipated to the atmosphere rather than being transferred to the adjacent frame members (which might not even be in contact with the straps 100).

One of the principal advantages of the illustrative body structure is that the lining 80 can be readily detached from the skeletal frame for maintenance or replacement purposes. The straps 100 attached to any or all of the lining plates 81–89 can be easily severed by the use of a cutting torch, thereby releasing the lining plate or plates for removal from the skeletal frame. A new plate or plates can then be inserted in place of the removed plate or plates, and new coupling straps 100 attached thereto. This is a significant advantage because in many applications the lining of a truck or trailer body wears out and must be replaced several times over the life of the body. The present invention permits such lining replacement to be carried out quickly and efficiently, thereby minimizing the cost of maintaining the body.

Various modified structures for coupling the lining 80 to the skeletal frame 20 are illustrated in FIGS. 10–14. In the embodiment of FIGS. 10a and 10b, the U-shaped strap 100 is replaced with a U-shaped rod 110, the outboard portion of which extends through a cylindrical sleeve 111 welded to the adjacent frame member F. The inboard ends of the rod 110 extend through the lining 80 and are fastened thereto by welding a pair of washers 112 and 113 to both the rod 110 and the inside surface of the lining 80. This arrangement permits limited movement between the lining 80 and the skeletal frame 20 along the same axis X described above in connection with FIG. 7, as well as an axis Z extending perpendicularly to the plane of the lining 80. That is, the lining 80 can expand and contract toward and away from the skeletal frame 20. It will be appreciated that this arrangement permits the spacing beads 105 to be eliminated, if desired, because the U-shaped rods 110 will hold the lining 80 spaced away from the frame 20 due to the welded connection between the frame member F and the sleeve 111 which fits fairly closely around the rod 110 (without inhibiting sliding movement of the rod 110 through the sleeve 111).

In the modified embodiment of FIGS. 11a and 11b, the coupling between the lining 80 and the skeletal frame 20 comprises a pin 120 which extends all the way through the hollow frame member F and the lining 80. The inner end of the pin 120 is rigidly fastened to the lining by means of a washer 121 which is welded around its outer periphery to the lining 80 and around its inner periphery to the inner end of the pin 120. The outer end of the pin 120 is rigidly fastened to the frame member by a washer 122 which has its inner periphery welded to the pin 120 and its outer periphery welded to the frame member. The length of the pin 120 is selected to space the lining 80 away from the inside surface of the frame member F by a predetermined gap corresponding to the gap maintained by the spacing beads in the embodiment of FIGS. 1–9; in the embodiment of FIGS. 11a and 11b, the spacing beads can be omitted if desired because the desired space is maintained by the coupling pins 120. This embodiment is useful primarily in applications where the body is to be subjected to only relatively low temperatures, because the only relative movement that can take place between the lining 80 and the frame 20 is that permitted by bending of the coupling pins 120. As an alternative, slots can be formed in the walls of the frame member F to permit limited sliding movement of the pins 120 within the frame member.

The modified coupling arrangement shown in FIGS. 12a and 12b is similar to that described above in connection with FIGS. 1–9 except that the U-shaped strap 130 in this case is made from thicker bar stock so that the ends thereof can be drilled and tapped to receive a pair of fastening screws 131 and 132. These screws are passed through a pair of mating holes drilled in the lining 180 and threaded into the tapped holes in the strap 130 so that the lining and the strap are firmly but removably fastened to each other. This type of coupling arrangement is particularly useful for facilitating removal of the lining 80 for maintenance or replacement purposes, because it avoids the need for the use of a cutting torch to remove straps that are fastened to the lining by welding rather than by the use of screws or other removable fasteners. This coupling arrangement permits relative movement between the lining 80 and the skeletal frame 20 along the same axes X and Y described above in connection with the embodiment of FIGS. 1–9.

A further modified coupling arrangement shown in FIGS. 13a and 13b is similar to the structure of FIGS. 10a and 10b except that two L-shaped rods 140 and 141 take the place of the U-shaped rod 110. One end of each L-shaped rod 140 and 141 is welded to the exterior surface of the lining 80, and the other end of each rod fits into a sleeve 142 which is welded to the exterior surface of the skeletal frame. The spacing beads 105 are present in this embodiment, and thus a larger diameter sleeve is used to allow for relative movement between the lining and the frame along the Z axis.

In yet another modified coupling arrangement shown in FIGS. 14a and 14b, a generally L-shaped structure is affixed to the exterior surface of the lining between adjacent pairs of frame members F1 and F2. In the particular embodiment illustrated, the L-shaped structure comprises angles 150 and 151 welded to the lining 80; these angles 150 and 151 extend outwardly from the lining 80 and are hooked over a retaining bar 152 which extends between, and is welded to, the pair of adjacent frame members F1 and F2. The hooking of the angles 150 and 151 on the retaining bar 152 holds the lining 80 captive on the skeletal frame 20. It is preferred to use the spacing beads 105 with this coupling arrangement in order to hold the lining 80 spaced away from the interior surfaces of the frame 20. When the spacing beads 105 are utilized, this coupling arrangement permits relative movement between the lining 80 and the frame 20 along the same axes X and Y described above in connection with FIGS. 1–9.

As can be seen from the foregoing detailed description, this invention provides an improved vehicular body which is capable of hauling hot blast furnace slag or similar materials, while minimizing thermal and physical stresses on the primary structure of the body. Consequently, this improved body has a long operating life with little or no maintenance. Heat is efficiently dissipated from the hot slag being hauled without subjecting the primary load-bearing structure to excessive temperature fluctuations, thereby minimizing the temperature ranges through which the load-bearing structure is cycled when hauling successive loads of hot slag. The improved body provided by this invention also minimizes the stresses imposed thereon by thermal expansion and contraction, including stresses due to differential rates of thermal expansion and contraction between different parts of the body, such as the liner and the skeletal frame. Moreover, the interior lining of the body, which is the part that wears most rapidly, can be easily removed and replaced. Furthermore, this improved body structure minimizes the body weight, with corresponding reductions in manufacturing and operating costs, relative to existing hot material-hauling bodies. In addition, this body structure can be efficiently and economically manufactured.

I claim as my invention:

1. A vehicular body for hauling hot materials comprising
    an external skeletal frame of metal members forming the primary load-transmitting structure of the body,
    a removable metal lining supported by said skeletal frame and forming the interior surface of the body for containing loads of hot material, the exterior surface of said lining being exposed to the ambient atmosphere through the openings in said skeletal frame for dissipating heat from loads of hot material, and
    coupling means securing said lining to said skeletal frame while permitting relative movement between said lining and said frame so that said lining and said frame can expand and contract differentially without stressing each other said coupling means comprises a plurality of retaining elements fastened to said lining and extending outwardly therefrom to engage an adjacent portion of said skeletal frame to hold said lining captive on said frame, said retaining elements permitting relative movement between said frame and said lining.

2. A vehicular body as set forth in claim 1 which includes means for limiting thermal conduction between said skeleton frame and said lining to minimize the temperature cycling of said frame.

3. A vehicular body as set forth in claim 2 wherein said means for limiting thermal conduction comprises spacers which limit the area of direct contact between said frame and said lining.

4. A vehicular body as set forth in claim 1 wherein said coupling means comprises means for normally holding said lining spaced away from said frame.

5. A vehicular body as set forth in claim 1 wherein said coupling means comprises a plurality of retaining elements fastened to said lining and extending outwardly therefrom around an adjacent portion of said frame to hold said lining captive on said frame, said retaining elements permitting relative movement between said frame and said lining along at least two mutually perpendicular axes.

6. A vehicular body as set forth in claim 5 wherein said mutually perpendicular axes are both parallel to the plane of said lining.

7. A vehicular body as set forth in claim 5 wherein one of said mutually perpendicular axes is parallel to the plane of said lining and the other of said axes is perpendicular to the plane of said lining.

8. A vehicular body as set forth in claim 1 wherein said coupling means comprises a plurality of retaining elements extending through portions of said frame, said retaining elements permitting relative movement between said frame and said lining along at least two mutually perpendicular axes.

9. A vehicular body as set forth in claim 1 wherein said coupling means are fastened to said lining by removable fastening means to facilitate the removal of said lining from said skeletal frame for maintenance or replacement purposes.

10. A vehicular body as set forth in claim 1 wherein said lining comprises a plurality of different plates each of which is free to expand and contract relative to adjacent plates.

11. A vehicular body as set forth in claim 10 wherein at least certain pairs of adjacent plates overlap each other in sliding contact so that the plates can expand and contract relative to each other.

12. A vehicular body for hauling materials comprising an external skeletal frame of metal members forming the primary load-transmitting structure of the body, a metal lining supported by said skeletal frame and forming the interior surface of the body for containing loads of material, said lining covering the openings in said skeletal frame, and coupling means for detachably fastening said lining to said skeletal frame so that said lining can be removed from said frame for maintenance or replacement purposes, said coupling means comprises a plurality of retaining elements fastened to said lining and extending outwardly therefrom to engage an adjacent portion of said skeletal frame to hold said lining capative on said frame, said retaining elements permitting relative movement between said frame and said lining.

13. A vehicular body as set forth in claim 12 which includes means for limiting thermal conduction between said skeleton frame and said lining to minimize the temperature cycling of said frame.

14. A vehicular body as set forth in claim 13 wherein said means for limiting thermal conduction comprises spacers which limit the area of direct contact between said frame and said lining.

15. A vehicular body as set forth in claim 12 wherein said detachable fastening means couples said lining to said skeletal frame while permitting relative movement between said lining and said frame so that said lining and said frame can expand and contract differentially without stressing each other.

16. A vehicular body as set forth in claim 12 wherein said lining comprises a plurality of metal plates each of which is free to expand and contract relative to the other plates.

17. A vehicular body for hauling materials comprising an external skeletal frame of metal members forming the primary load-transmitting structure of the body, a metal lining supported by said skeletal frame and forming the interior surface of the body said covering the openings in said skeletal frame for containing loads of material, said lining being formed by a plurality of metal plates which are free to expand and contract relative to each other, and coupling means for detachably fastening each of said lining plates to said skeletal frame said coupling means comprises a plurality of retaining elements fastened to said lining and extending outwardly therefrom to engage an adjacent portion of said skeletal frame to hold said lining captive on said frame, said retaining elements permitting relative movement between said frame and said lining.

* * * * *